L. L. RINER.
SECTIONAL HOG FEEDER.
APPLICATION FILED JULY 19, 1920.
1,399,716.
Patented Dec. 6, 1921.
2 SHEETS—SHEET 1.
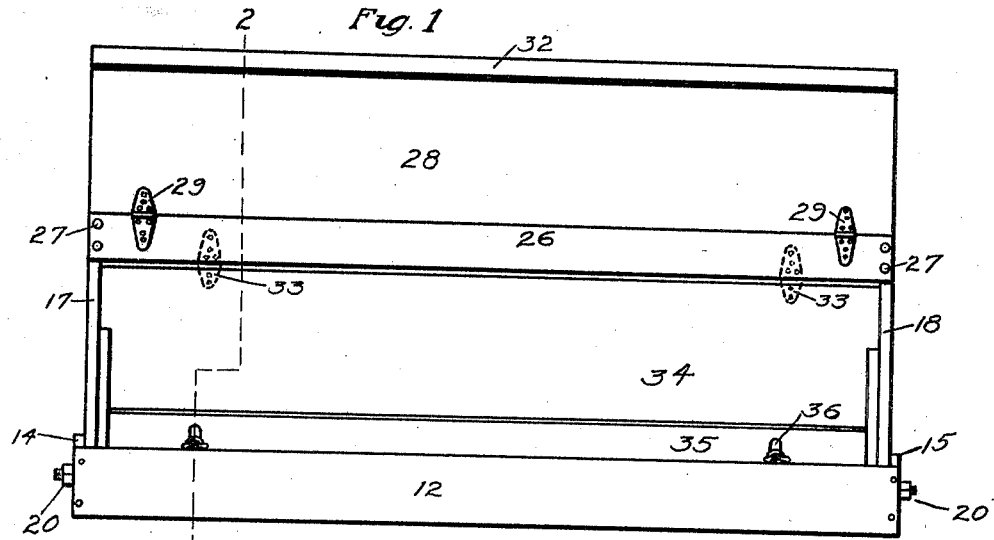
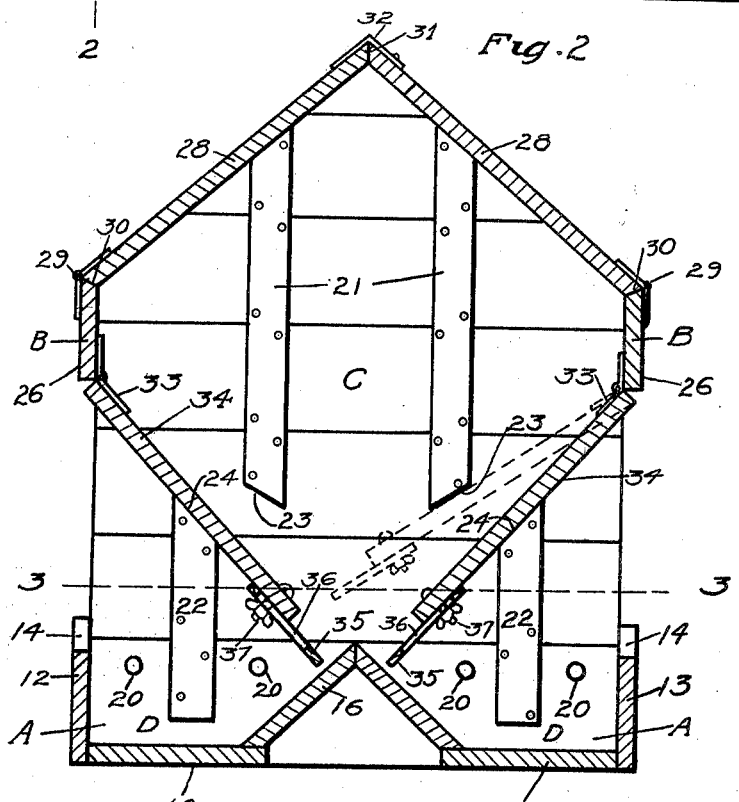
WITNESS.
Fletcher Brown.
INVENTOR.
Lisle L. Riner
By Bair & Freeman ATTORNEYS.

L. L. RINER.
SECTIONAL HOG FEEDER.
APPLICATION FILED JULY 19, 1920.
1,399,716.
Patented Dec. 6, 1921.
2 SHEETS—SHEET 2.
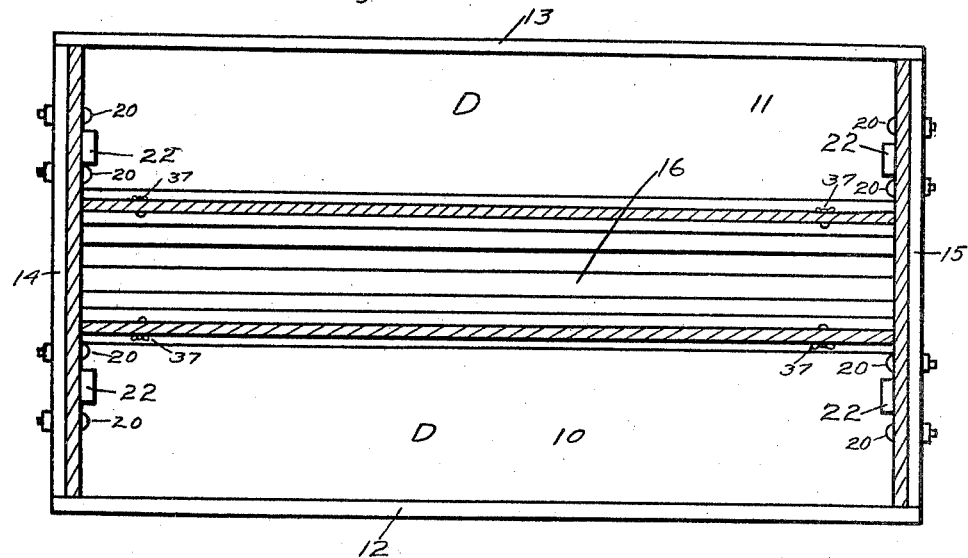
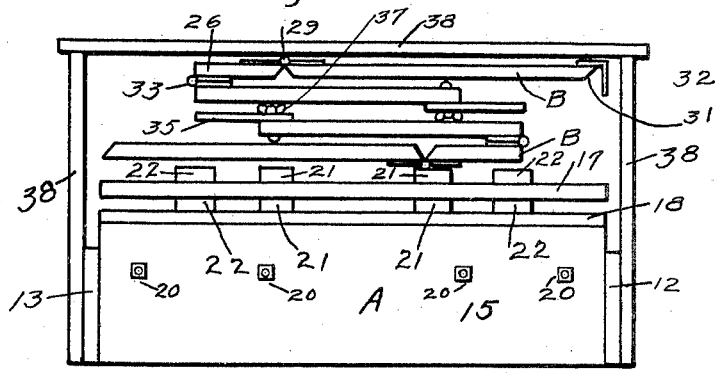
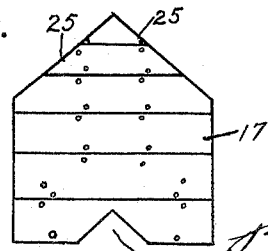
Witness.
Fletcher Brown
Inventor
Lisle L. Riner
By Bair & Freeman Attorneys.

UNITED STATES PATENT OFFICE.

LISLE L. RINER, OF GREENVILLE, IOWA.

SECTIONAL HOG-FEEDER.

1,399,716.  Specification of Letters Patent.  Patented Dec. 6, 1921.

Application filed July 19, 1920. Serial No. 397,280.

*To all whom it may concern:*

Be it known that I, LISLE L. RINER, a citizen of the United States, and a resident of Greenville, in the county of Clay and State of Iowa, have invented a certain new and useful Sectional Hog-Feeder, of which the following is a specification.

The object of my invention is to provide a sectional hog feeder of simple, durable and inexpensive construction.

More particularly it is my object to provide a hog feeder, so adapted that it may be readily assembled from its knock-down position by the use of only a few bolts or the like.

A further object is to provide a hog feeder, comprising a pair of combined top and side members, the parts being so arranged that it may be taken apart and shipped in sections, the sections being interchangeable with each other.

A further object is to provide a device adapted to be knocked down and nested in a minimum amount of space for crating and shipping.

A further object is to provided a feeder having a hopper and a pair of feed troughs, the sides of the hopper being capable of a slight pivotal movement, so that the feed within the hopper may be agitated by the animals for keeping the feed at the discharge openings within the hopper loose.

A further object is to provide an adjustable member mounted adjacent to the discharge opening in the hopper for regulating the amount of feed discharged from the hopper.

With these and other objects in view, my invention consists in the construction arrangement and combination of the various parts of the device, whereby the objects contemplated are attained, as hereinafter more fully set forth, pointed out in my claims, and illustrated in the accompanying drawings, in which:

Figure 1 shows a side elevation of my improved hog feeder.

Fig. 2 shows a central, sectional view taken on line 2—2 of Fig. 1, one of the side members of the hopper being shown in dotted lines in another of its positions.

Fig. 3 shows a central, sectional view taken on line 3—3 of Fig. 2.

Fig. 4 shows an end view of the feeder in its knocked-down sectional form, the parts being crated for shipment; and Fig. 5 shows a side view of one of the end wall members.

In the accompanying drawings, I have used the reference character A to indicate a base. The base A is provided with a pair of floor members 10 and 11. Fixed to the floor members 10 and 11 are the short side walls 12 and 13. The floor members 10 and 11 are slightly spaced from each other, as shown in Fig. 2 of the drawings.

The short side walls 12 and 13 have their ends connected by the somewhat higher end members 14 and 15. Parallel with the side walls 12 and 13 is the dividing member 16, which has its lower ends fixed to the floor members 10 and 11.

The parts just described form what I call the base and form one unit of the feeder.

Adapted to be fixed to the base A against the end wall members 14 and 15 are the end walls 17 and 18. The end walls 17 and 18 are placed within the base A against the short end walls 14 and 15 and are bolted to them by means of the bolts 20.

The end walls 17 and 18 are provided with cleats or strips 21 and 22. The strips 21 have their lower edges beveled at 23, the purpose of which will hereafter be more fully set forth. The strips or cleats 22 have their upper edges beveled at 24.

The upper edges of the end walls 17 and 18 are tapered upwardly at 25 substantially as is shown in Figs. 2 and 5 of the drawings.

The end walls 17 and 18 form an independent unit of the feeder and are interchangeable.

In order to complete the entire feeder, I have provided the members B which form combined top and side members. Each of the members B comprises a horizontal bar 26, which has its ends fixed to the side edges of the end walls 17 and 18 by means of the screws 27.

It will be seen that when the end walls 17 and 18 are fixed to the base and the horizontal bars 26 are fixed to the end walls, that I have provided a substantially rigid construction.

Hinged to the members 26 are the top or cover members 28. The cover members 28 are hinged by means of the hinge members 29. The edges of the cover members 28 are beveled at 30, so as to form a tight connection between the bars 26 and the cover member 28.

The free ends of the cover members 28 are beveled at 31, so that they may rest snugly against each other, when they are in the position shown in Fig. 2 of the drawings.

The cover members are adapted to rest upon the end walls 17 and 18 and set on the tapered portions 25.

Fixed to one of the cover or top members 28 is the weather cap 32, which is preferably made of sheet metal and designed to extend over the beveled edges 31, so as to prevent any rain or the like from entering into the feeder.

Fixed to the inner side of the bars 26 and adjacent to its lower edges are the hinges 33. Fixed to the hinges 33 are the side members 34, which have their lower ends swung inwardly substantially adjacent to each other.

It will be seen that by providing the hinge 33 as a connection between the bar 26 and the side members 34, I am able to swing the side members 34.

The beveled edges 23 and 24 of the strips 21 and 22 act as tops for limiting the hinge movement of the side members 34, in either direction.

In Fig. 2 of the drawings, I have shown one of the side members 34 in dotted lines in its uppermost position. Fixed to each of the lower ends of the sides 34 are the adjustable members 35, which are provided with elongated slots 36. The adjustable members 35 are held to the sides 34 by means of the wing bolts 37.

It will be seen that by loosening the wing bolts 37, I am able to adjust the adjustable member 35, so that its lower edge may be very close to the dividing member 16 or a greater distance as is desired.

From the construction of the parts just described, it will be seen that I have provided substantially five sections, which may readily be assembled or taken apart as desired. The five sections when assembled, as is shown in Figs. 1 and 2 of the drawings, form a complete hog feeder.

The compartment C will be formed near the upper portion of the feeder and forms a hopper for containing the feed. By opening either of the top or cover members 28, I am able to place feed into the hopper C. The feed will rest against the side members 34 and tend to hold them in their lower position.

Between the dividing member 16 and the short side members 12 and 13 will be formed the compartments or feeding troughs D.

Feed from the hopper C will pass down into the troughs D so long as there is a space left between the lower end of the adjustable member 35 and the dividing member 16. The amount of feed permitted to pass into the troughs D may be varied by the operator by merely adjusting the position of the adjustable members relative to the sides 34, or if it is desired to entirely shut the feed off on one side of the feeder, that is using only one of the feed troughs, it may readily be done by moving the adjustable member, so that its lower edge rests against the upper surface of the dividing member 16.

The animals may stick their heads into the feed troughs through the opening formed between the bars 26 and the side members 12 and 13.

When the feed for any reason becomes clogged at its discharge opening, the desire of the animal to reach the feed will cause him to push against the side members 34, thus agitating the feed and loosening it up, so that it will continue to flow through the discharge opening into the feed troughs D.

However, the upward movement of the side members 34 will be limited by their coming in contact with the beveled edge 23 of the cleats or strips 21.

In Fig. 4 of the drawings, I have shown the feeder in its knocked-down form crated ready for shipment.

Referring to Fig. 4, when the device is in its knocked-down form, the ends 17 and 18 are placed upon the base A, while the combined top and side members B are placed upon the end walls. A crate 38 is fixed to the base A and is also fixed to the top member B. By merely placing a few nails in the base A and the crate 38 and the member B, I am able to completely pack the device and have it crated for shipment in its knocked-down form.

When the knocked-down sectional feeder reaches its ultimate owner, it may readily and easily be assembled by merely placing the bolts 20 into position and then by fixing the screws 27 for holding the members B to the end walls 17 and 18.

In the assembling of the device, the side members 34 are first slid into position between the strips 21 and 22, and then the screws 27 are put in position, which completes the assembling of the feeder.

The advantages of my device are that I am able to build a feeder comprising substantially five sections; each section serving as a unit and interchangeable with any other section of its character, that is the combined top and side members are interchangeable with each other, while the ends 17 and 18 may be used interchangeably.

Another advantage of my device is that I am able to ship my device in knocked-down form, where it will occupy only a minimum amount of space for shipping, thus making it very easy to handle a small compact bundle rather than handling a large cumbersome feeder.

Another advantage is that I am able to use the sides 34 as a part of the walls of the hopper C and at the same time fix them by means of a hinged connection, which will permit slight pivotal movement of the sides 34 in order to agitate the feed and permit its free flow.

Another advantage is that I use the strips or cleats 21 and 22 for holding the ends together, whereby they will form an independent unit or section, at the same time the cleats serving as stop devices for limiting the pivotal movement of the side members 34.

When the parts are nested or knocked-down for shipment, the bar 26 and the top 28 are placed in the same horizontal plane, while the side 34 is swung around to position, where it will be substantially parallel with the bar 26 and the top 28. It will be seen that this is accomplished by providing the hinge 29 on the outside of the bar 26 and the hinge 33 on the inside of the bar 26.

Some changes may be made in the construction and arrangement of the parts of my improved device, without departing from the essential features and purposes of my invention, and it is my intention to cover by my claims, any modified forms of structure or use of mechanical equivalents, which may be reasonably included within their scope.

I claim as my invention:

1. A feeder for swine comprising a base having a pair of feed troughs therein, and a dividing member fixed therebetween, a pair of end wall members adapted to be detachably fixed to said base, and a pair of combined top and side members, said side members being capable of slight pivotal movement, whereby feed within the feeder may be agitated, combined reinforcing cleats and stop devices fixed to the end members for limiting the pivotal movement of the side members and for reinforcing the end members, said combined cleats and stop members being designed to have the edge of the side members received therebetween and have their adjacent surfaces beveled so that the upper and lower edges overlap for forming a continuous reinforcing cleat, and an adjustable feed control board fixed to the lower ends of each of said side members, whereby the flow of feed into the troughs may be regulated.

2. A feeder for swine comprising a base having a pair of feed troughs therein, and a dividing member fixed therebetween, a pair of end wall members adapted to be detachably fixed to said base, and a pair of combined top and side members, the said parts forming a hopper for containing feed, the side members being capable of pivotal movement, combined cleats and stop members fixed on the adjacent surfaces of the end wall members for limiting the amount of pivotal movement of said side member in either direction, said combined cleats and stop members having their adjacent surfaces beveled so that their upper and lower edges over lap, thus forming a continuous reinforcing cleat for the side members.

3. A knock-down sectional feeder comprising a base, a pair of end members and a pair of combined top and side members, said base being provided with a pair of parallel feed troughs, the end members being designed to be removably fixed to said base, the combined top and side members being fixed to said ends, whereby a feed hopper will be formed, the side portion of said last members being capable of pivotal movement, stop devices for limiting the pivotal movement of said side portions fixed to the end wall members, said stop devices serving as reinforcing cleats and provided with beveled surfaces having their upper and lower edges overlap for forming a continuous reinforcing cleat, said stop devices being adapted to strike against the inner and outer surfaces of said side portions and adapted to receive the side portions therebetween, an adjustable member mounted on the lower end of said side portions, said adjustable member including a member having a pair of elongated slots therein and a pair of bolts extended through the side portions and adapted to be received in said slots, whereby the adjustable member may be varied to regulate the flow of feed into the troughs.

4. A knock-down sectional feeder comprising a base, a pair of end members and a pair of combined top and side members, said base being provided with a pair of parallel feed troughs, and a dividing partition member spaced between said feed troughs, the end members being designed to be removably fixed to said base, the combined top and side members being fixed to said ends, whereby a feed hopper will be formed, the side portion of said last members being capable of pivotal movement, combined cleats and stop devices for limiting the pivotal movement of said side portions fixed to the end wall members, and adapted to engage the inner and outer surfaces of said side portion for limiting its pivotal movement, said combined cleats and stop devices having their adjacent surfaces beveled so that their upper and lower edges overlap, thus forming a continuing reinforcing cleat for the side members, an adjustable member mounted on the lower end of said side portions, said adjustable member including a member having a pair of elongated slots therein and a pair of bolts extended through the side portions and adapted to be received in said slots, whereby the adjustable member may be varied to regulate the flow of feed into the troughs.

Des Moines, Iowa, May 18, 1920.

LISLE L. RINER.